(12) United States Patent
Reddy et al.

(10) Patent No.: US 8,966,422 B1
(45) Date of Patent: Feb. 24, 2015

(54) MEDIAN LINE BASED CRITICAL TIMING PATH OPTIMIZATION

(71) Applicant: International Business Machines Corporation, Armonk, NY (US)

(72) Inventors: Lakshmi N. Reddy, Briarcliff Manor, NY (US); Sourav Saha, Barrackpur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/149,150

(22) Filed: Jan. 7, 2014

(51) Int. Cl.
*G06F 17/50* (2006.01)

(52) U.S. Cl.
CPC .................... *G06F 17/5072* (2013.01)
USPC .......................................................... 716/118

(58) Field of Classification Search
USPC .......................................................... 716/119
See application file for complete search history.

(56) References Cited

U.S. PATENT DOCUMENTS

| | | | | |
|---|---|---|---|---|
| 5,397,749 | A | * | 3/1995 | Igarashi ........................ 716/113 |
| 6,845,494 | B2 | * | 1/2005 | Burks et al. .................... 716/108 |
| 2002/0049958 | A1 | * | 4/2002 | Shimazawa .................... 716/18 |
| 2005/0034091 | A1 | | 2/2005 | Harn |
| 2005/0108665 | A1 | | 5/2005 | Neves et al. |
| 2006/0010413 | A1 | | 1/2006 | Curtin et al. |
| 2008/0209376 | A1 | | 8/2008 | Kazda et al. |
| 2008/0276210 | A1 | | 11/2008 | Albrecht et al. |

FOREIGN PATENT DOCUMENTS

| | | |
|---|---|---|
| EP | 1528487 | 4/2005 |
| JP | 2001297127 | 10/2001 |
| WO | 2013025934 A1 | 2/2013 |

OTHER PUBLICATIONS

Wang, Wenping et al, "Node Criticality Computation for Circuit Timing Analysis and Optimization under NBTI Effect", In Quality Electronic Design, 2008, ISQED2008. 9th International Symposium on Quality Electronic Design, IEEE 2008, pp. 763-768.
Wu, Di et al, "Coupling Aware Timing Optimization and Antenna Avoidance in Layer Assignment", In Proceedings of the 2005 international syposium on Physical design, pp. 20-27. ACM, 2005.

* cited by examiner

*Primary Examiner* — Jack Chiang
*Assistant Examiner* — Brandon Bowers
(74) *Attorney, Agent, or Firm* — Cantor Colburn LLP; Margaret McNamara

(57) ABSTRACT

A computer implemented method for designing an integrated circuit includes: forming, on a computing device, a description of an initial layout of the integrated circuit, the layout including at least two paths, each of the two paths including an input, an output and an at least one combinational element; identifying critical paths in the initial layout; forming a median line between the input and the output for at least one of the critical paths; and moving a location of a combinational element in the at least one critical path from a first location to a second location to form a revised layout, the first location being further from the median line than the second location.

18 Claims, 7 Drawing Sheets

MEDIAN LINE BASED CRITICAL TIMING PATH OPTIMIZATION

BACKGROUND

The present invention relates generally to optimization and, more specifically, to optimizing critical timing paths in integrated circuits.

Organizing circuits on a substrate of a semiconductor is a task that can achieve efficiencies in overall circuit speed when electronic design automation instructions are processed on a data processing system to reduce delays in circuit operation. The chief source of delay within a Very Large Scale Integrated (VLSI) circuit design is the time delay associated with signals traveling from one component to another. Time delay is a value determined for a wire based on the wire's resistance and capacitance in relation to the substrate to which it is coupled. For a given substrate and a given wire width, time delay is proportional to the length of the wire. Time delay can be a term that applies to a path that interconnects multiple components in a path. Time delay can be a term applied to plurality of paths that make up a circuit design.

A path is a geometric description of the interconnect between a set of pins or endpoints of one or more nets. A net is a subset of components in an integrated circuit design as well as the interconnection of the pins of the subset of components. Each path is associated with a path delay or timing delay. The path may pass through a net associated with a first component, and a net of a second component. The path can be a 2-pin net. Thus, the path may link two or more components together by including at least one endpoint or pin of each component. A pin is an input or an output wire to a component. A netlist describes all the components in a design, and describes how these components or pins on the components are interconnected. The netlist may be described in a text file that corresponds to the component. The netlist may be a derivative, through additional processing, of a file format that may be as described by Verilog, VHSIC Hardware Design Language (VHDL), among other high-level design languages. Verilog is a trademark of Cadence Design Systems.

In some cases, the signal needs to traverse a particular path in a time that is less than one clock period of the clock driving the integrated circuit. During a design phase it may be discovered that some paths cannot be traversed in such a time period. Such a path may be referred to as "critical timing path" herein. In such a case, if it is determined during design review for an integrated circuit that a critical timing path exceeds the clock period, many different approaches such as, for example, reducing the number of active or passive elements in the path or breaking a long path into two or more paths by the introduction of an intermediate stopping point may be applied to reduce the traversal time to below the limit.

SUMMARY

Systems, computer program products and computer implemented methods for designing an integrated circuit are disclosed. The method includes: forming, on a computing device, a description of an initial layout of the integrated circuit, the layout including at least two paths, each of the two paths including an input, an output and at least one combinational element; identifying critical paths in the initial layout; forming a median line between the input and the output for at least one of the critical paths; and moving a location of a combinational element in the at least one critical path from a first location to a second location to form a revised layout, the first location being further from the median line than the second location.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In some cases, a particular path may include components (e.g., combinational cells) that are placed far enough from each other that the timing delay introduced by the wiring connecting the components causes the path traversal time to exceed a predetermined limit (such as one clock period or a multiple thereof). Herein are disclosed methods for relocating the components to reduce or eliminate such situations.

Figure 1:
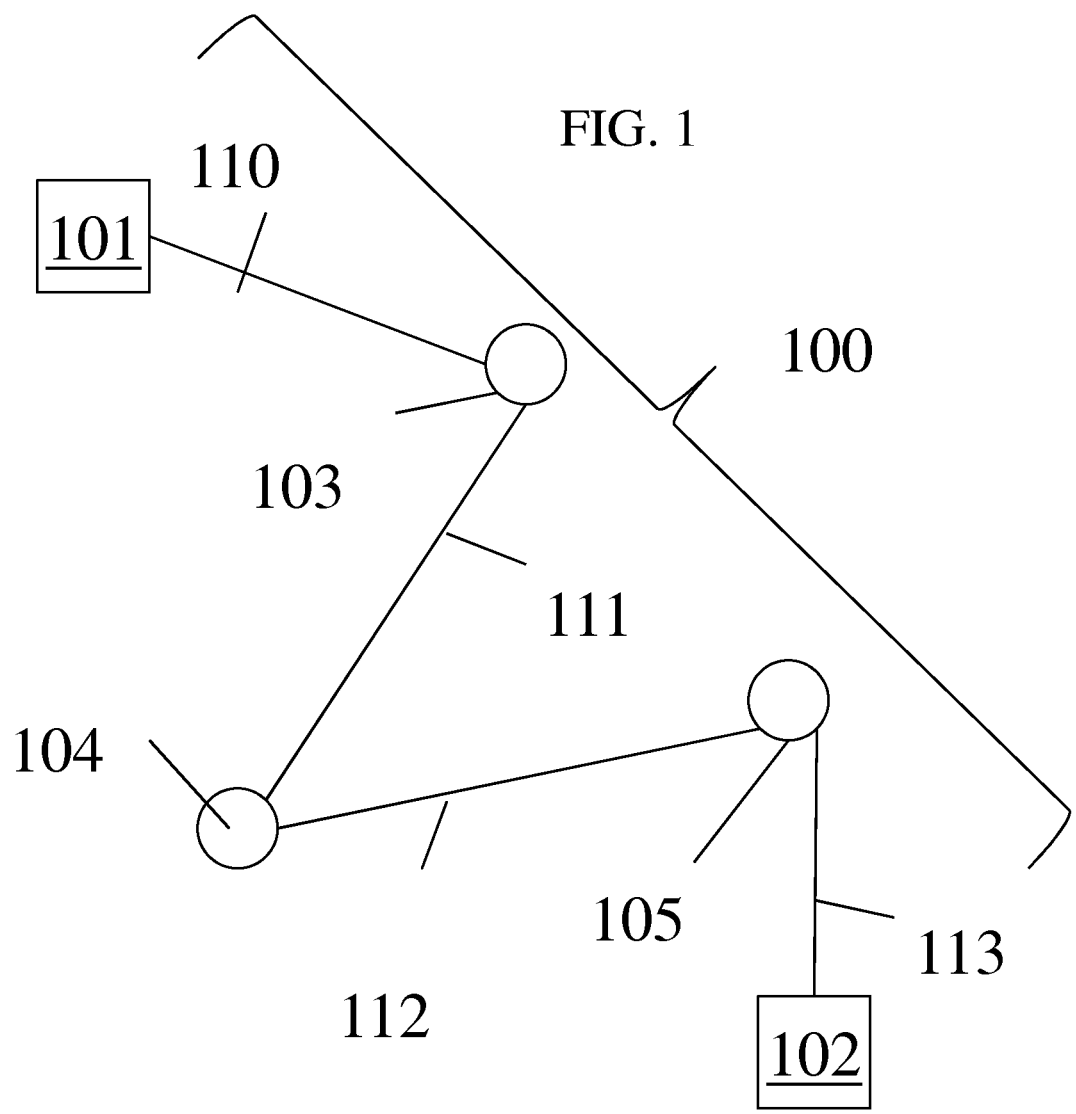
FIG. 1 depicts an example of a critical path in accordance with an embodiment.

FIG. 1 shows a simplified example of a path 100. The path includes an input location 101 and an output location 102. The input 101 and output 102 may be referred to as components or objects herein. In one embodiment, a component or object is an active switchable circuit in an integrated circuit. A component can be, for example, a gate, a buffer, a register, or a counter, among other circuits. Disposed between the input 101 and output 102 are three combinational elements 103, 104 and 105. For simplicity, a combination element may be referred to as a combo and may refer to any type of logic gate that either combines two or more signals (e.g., AND, NAND, NOR etc., gates) or changes the state of a signal (e.g., an inverter). Combos typically operate independent of clock and have fixed delay time associated with them.

In FIG. 1, three combos 103, 104, 105 are depicted. Each combo gate is comprised of a pin list. A pin list is a description of the pin locations that are inputs and outputs to a component. The pin lists of two or more components may form a net. The pin locations may be identified as locations relative to each other, or in any other manner, that defines a possible geometry of the component.

Within the design that expresses the circuit as a connection between various components and combos, is a path that has a path delay, of, in one example, 200 nanoseconds. Some amount of delay occurs because of delays internal to each combo. Other delay is introduced due to the wires 110-113 between the input 101 and the output 102. While shown as straight lines it shall be understood that in the context of an integrated circuit, the wires 110-113 may take a non-linear route between the combos and may, for instance, travel on different levels.

For a particular path, a timing analysis tool can be run to determine the path delay. The path delay can include the sum of propagation delays between endpoints of two components, as well as the delay resulting from the operation of the components. Each time a data processing system reroutes or otherwise impacts delay of a circuit, the timing analysis tool may be used to establish a new delay for the path. One of the steps that illustrative embodiments may perform is determining whether all the paths have met the timing requirements (e.g., are less than one clock period). Such timing requirements, or goals, are set by circuit designers in accordance with design objectives that may emphasize speed in circuit operation in one path, but comparatively, emphasize speed less in a second circuit's operation along a second path.

As discussed above, the path delay may exceed or be under a clock period in some cases. The amount by which the path delay exceeds or is under that clock period (or another preset limit) is referred to as slack. Slack of a path is the time that the designers set as a design goal for the path (e.g., one clock cycle) minus the time to propagate a signal through the path (e.g., the path delay). Accordingly, slack is based on the designer's tolerance for delay in a path and the actual delay predicted for the current placement of components that comprise endpoints of the path. Endpoints used in slack calculations by a timing analysis tool may fit into three categories and are referred to as components above: (a) primary input (PI) of the design; (b) a sequential element like a latch or flip-flop; and (c) primary output (PO) of the design. There can be multiple paths between: (i) a PI and a latch/flip-flop; (ii) a latch/flip-flop to another latch/flip-flop; (iii) a latch/flip-flop to a PO; or (iv) PI to PO. Each path can contain combinational components like AND, OR, NAND, NOR, buffers, among others.

A critical path is a path that has a timing delay that exceeds a timing threshold. The relationship between slack and criticality is an inverse relationship—the more negative the slack for a path, the more critical the path is. A path's criticality can be determined in several ways. First, all paths with a negative slack value can be considered critical. Second, all paths below a criticality threshold can be considered critical. It is appreciated that the criticality threshold can also be a positive value in circumstances where a designer chooses to further optimize non-negative paths.

Figure 2:
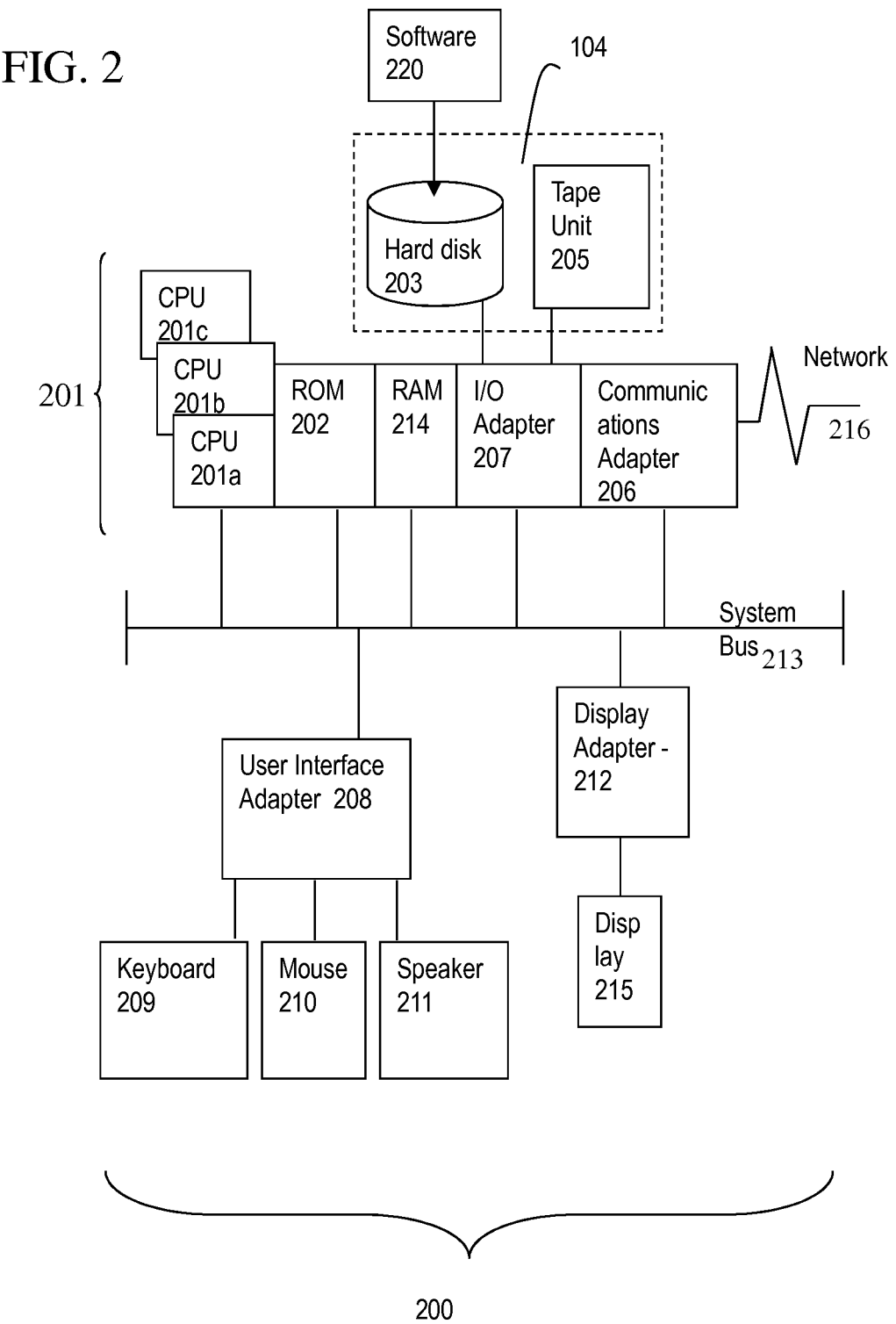
FIG. 2 depicts a computing device on which methods disclosed may be implemented in accordance with an embodiment.

FIG. 2 shows an example of a computing system 200 on which embodiments of the present invention may be implemented. In this embodiment, the system 200 has one or more central processing units (processors) 201a, 201b, 201c, etc. (collectively or generically referred to as processor(s) 201). In one embodiment, each processor 201 may include a reduced instruction set computer (RISC) microprocessor. Processors 201 are coupled to system memory 214 and various other components via a system bus 213. Read only memory (ROM) 202 is coupled to the system bus 213 and may include a basic input/output system (BIOS), which controls certain basic functions of the system 200.

FIG. 2 further depicts an input/output (I/O) adapter 207 and a network adapter 206 coupled to the system bus 213. The I/O adapter 207 may be a small computer system interface (SCSI) adapter that communicates with a hard disk 203 and/or tape storage drive 205 or any other similar component. The I/O adapter 207, hard disk 203, and tape storage device 205 are collectively referred to herein as mass storage 204. A network adapter 206 interconnects bus 213 with an outside network 216 enabling the computing system 200 to communicate with other such systems. A screen (e.g., a display monitor) 215 is connected to system bus 213 by a display adaptor 312, which may include a graphics adapter to improve the performance of graphics intensive applications and a video controller. In one embodiment, adapters 207, 206, and 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 213 via user interface adapter 208 and display adapter 212. A keyboard 209, mouse 210, and speaker 211 are all interconnected to bus 313 via user interface adapter 208, which may include, for example, a Super I/O chip integrating multiple device adapters into a single integrated circuit.

Thus, as configured in FIG. 2, the system 200 includes processing means in the form of processors 201, storage means including system memory 214 and mass storage 204, input means such as keyboard 209 and mouse 210, and output means including speaker 211 and display 215.

It will be appreciated that the system 200 can be any suitable computer or computing platform, and may include a terminal, wireless device, information appliance, device, workstation, mini-computer, mainframe computer, personal digital assistant (PDA) or other computing device. It shall be understood that the system 200 may include multiple computing devices linked together by a communication network. For example, there may exist a client-server relationship between two systems and processing may be split between the two.

The system 200 also includes a network interface 206 for communicating over a network 216. The network 216 can be a local-area network (LAN), a metro-area network (MAN), or wide-area network (WAN), such as the Internet or World Wide Web. Users of the system 200 can connect to the network through any suitable network interface 206 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 200 includes machine-readable instructions stored on a non-transitory tangible machine readable media (for example, the hard disk 203) for capture and interactive display of information shown on the screen 215 of a user. As discussed herein, the instructions are referred to as "software" 220. The software 220 may be produced using software development tools as are known in the art. The software 220 may include various tools and features for providing user interaction capabilities as are known in the art.

Figure 3:
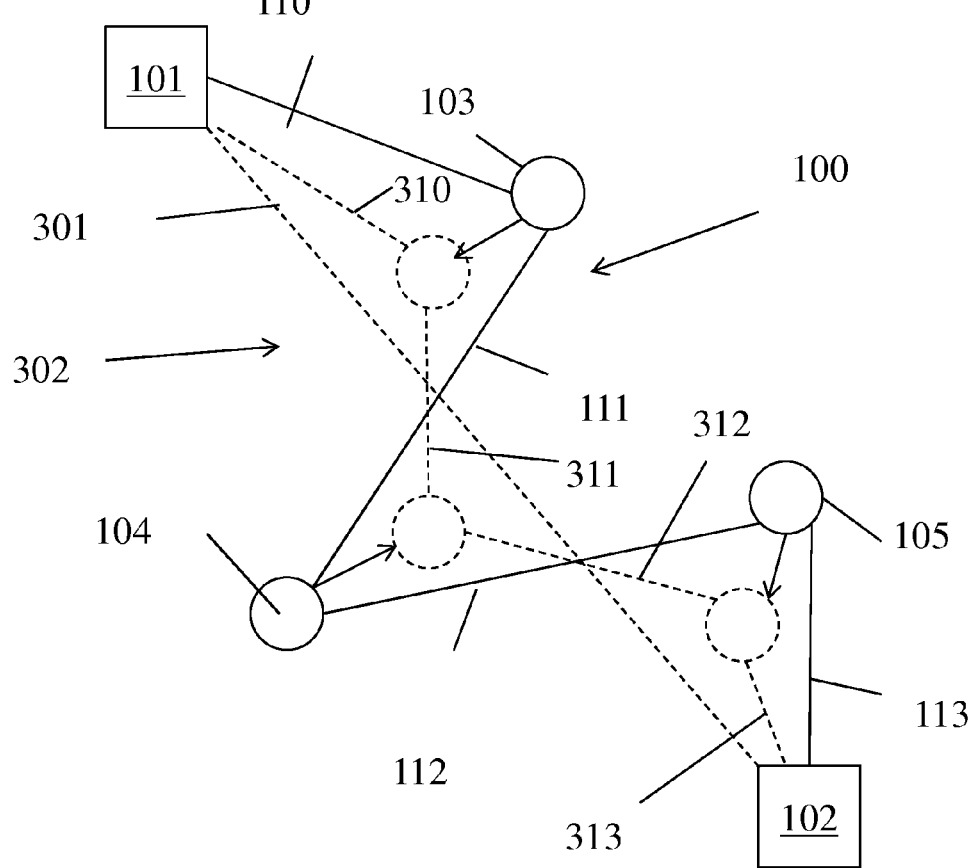
FIG. 3 depicts an example of a straightened critical path in accordance with an embodiment.

With reference now to FIG. 3, an example of a process of improving the slack in a critical timing path 100 (critical path) to form a revised path 302 (shown by dashed lines) that is less critical is pictographically illustrated. It shall be understood that the critical path 100 shown is exemplary only and is the same as that shown in FIG. 1. It shall also be understood that the fact that path 100 is critical may be determined by a computer implemented analysis of an integrated circuits design.

According to one embodiment, a median line 301 is formed between the input 101 and the output 102. The input 101 and the output 102 are fixed in location and cannot be moved in one embodiment. In some cases, combos may also be fixed as will be discussed further below. In this example, all combos 103-105 are movable. As illustrated, the combos 103-105 are all moved closer to the median line 301 in the direction of the arrows projecting from the combos 103-105 to new locations (indicated by dashed circles). In this case the new path 301 is comprised of combos 103-105 connected by wires 310, 311, 312 and 313. The length of the wires 310-313 is less than the length of the wires 110-113. As such, the delay they impart is less. According to one embodiment, a median line is formed between the input and output of a critical path. The combos between the input and output are then moved closer to the median line to reduce timing delay. In a vacuum, the ideal solution would be to always move the combos to the median line. However, certain constraints may make such an approach impractical or impossible. For instance, one or more of the combos may be designated as fixed and non-movable by the circuit designer. Also, in some cases, a combo in one path may also be part of another path. In such a case, moving the combo too far in the direction of the median line may negatively affect another path and convert an otherwise "acceptable" path into a critical path. Further, in some cases the median line may cross portions of the integrated circuit that are reserved and over which wires may not cross. In this same vein, even if the median line does not directly cross a reserved portion, bringing one or more of the combos closer to the median line may cause the connecting wires to cross the reserved portion.

Figure 4:
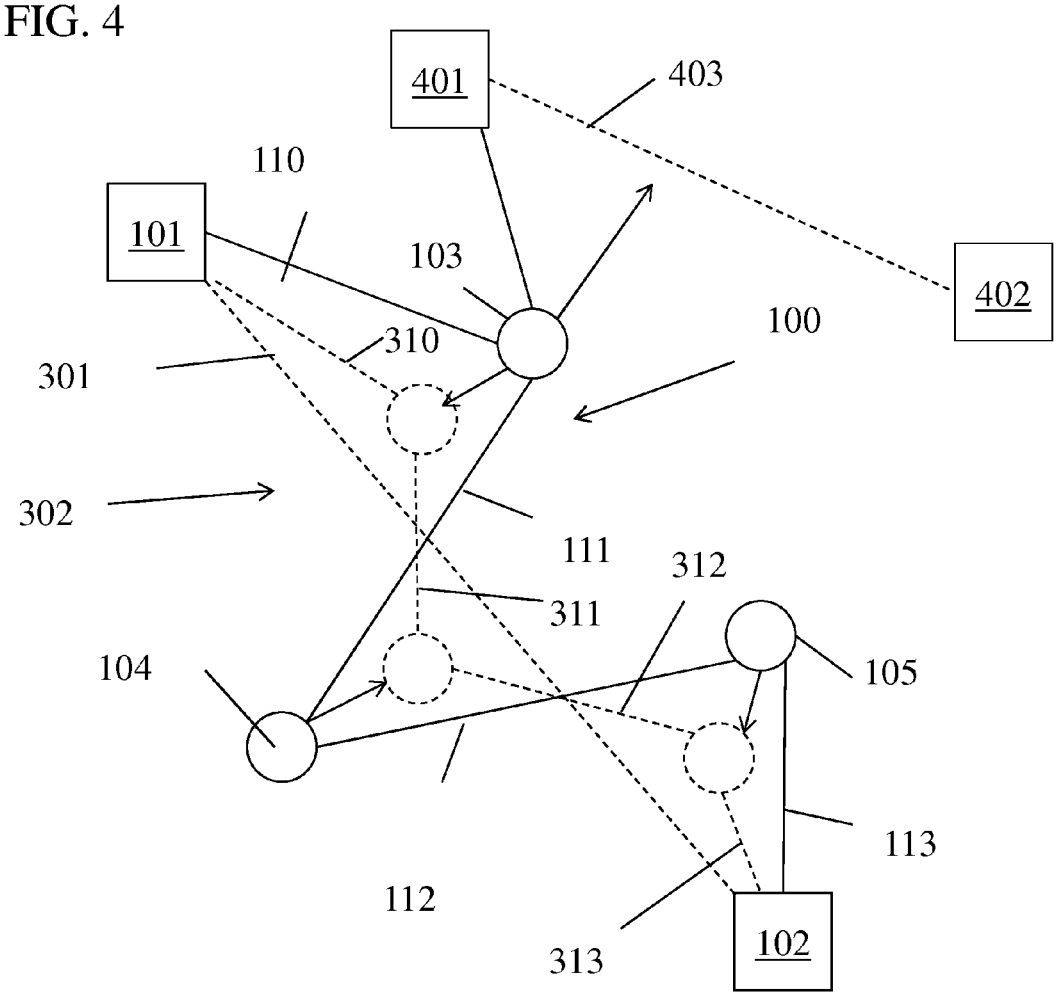
FIG. 4 depicts an example of a conflict between a path and a straightened critical path in accordance with an embodiment.

FIG. 4 shows an example of where combo 103 is part of two different paths (path 100 and the path between elements 401 and 402). As is evident from FIG. 4, if element 103 is moved closer to median line 301, then it is taken further away from median line 403 and may negatively harm the path timing between elements 401 and 402. In such a case, allowances of the total negative slack may be considered to determine the best location for combo 103.

Figure 5:
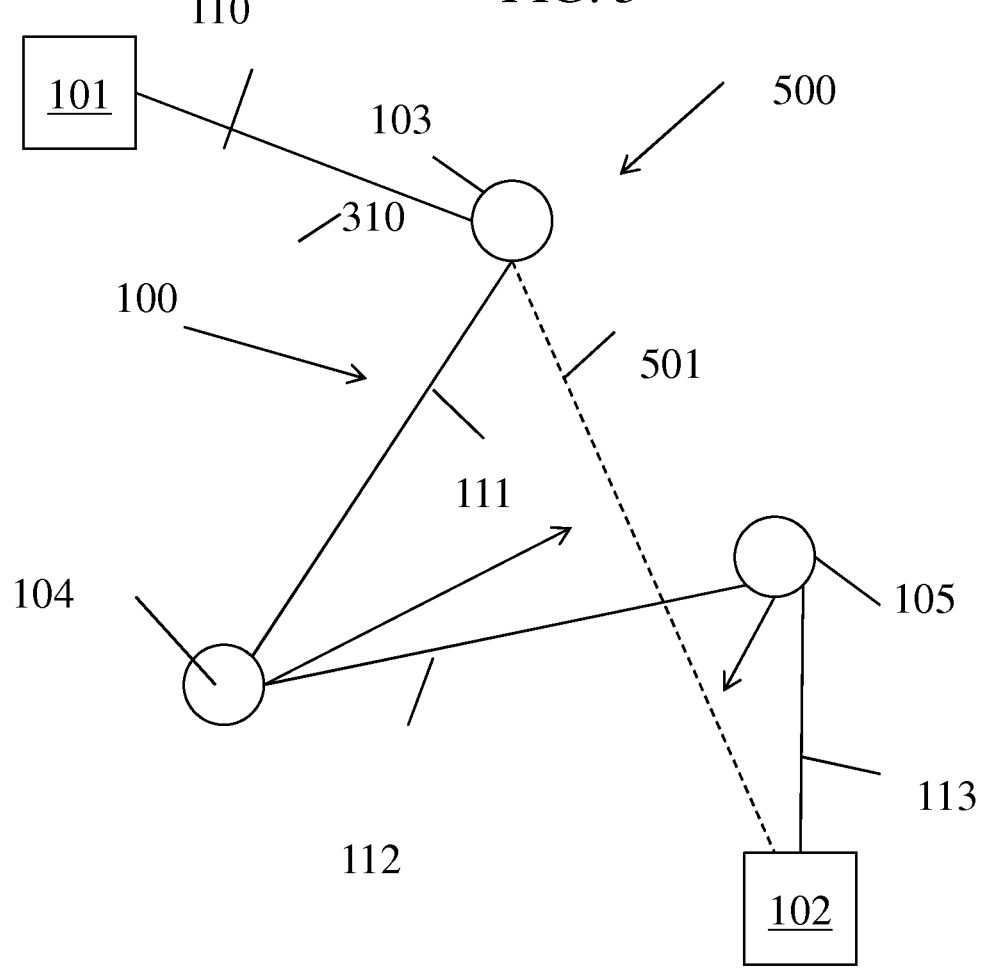
FIG. 5 depicts a segmented median line formed according to one embodiment.

FIG. 5 illustrates the condition where a segmented line 500 that includes original wire 110 and pseudo median line 501. As combo 103 and input 101 cannot be moved, the wire 110 must remain and the only improvement that can be made is via pseudo median line 501 from the fixed combo 103 to output 102. The other combos (104, 105) are moved towards the pseudo median line 501 as described above. Of course, a particular path could have many fixed elements. In such a case, median lines are formed between successive fixed elements and any intervening combos are moved towards that median line. In FIG. 5, combos 104 and 105 are intervening combos between fixed combo 103 and fixed output 102.

Figure 6:
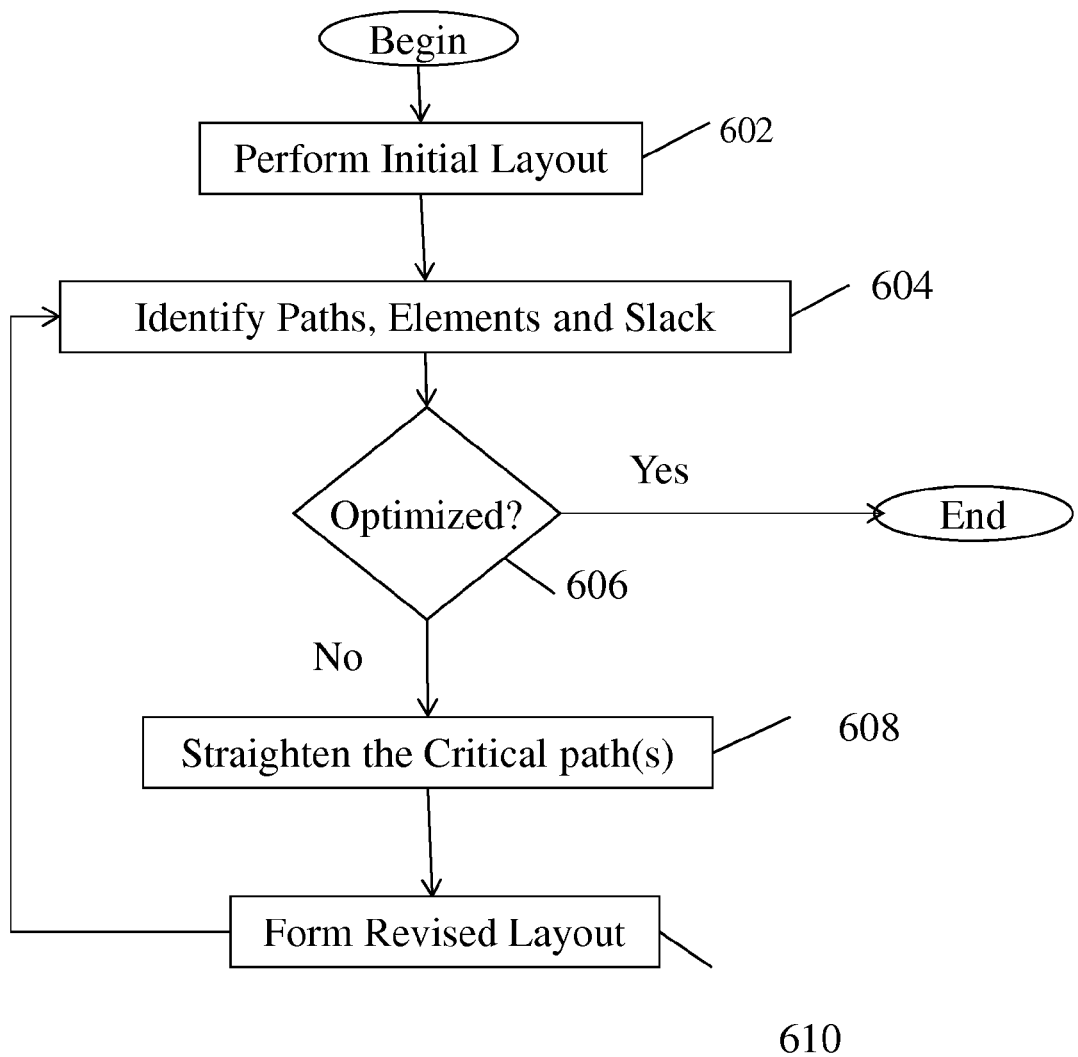
FIG. 6 depicts a process flow for reducing critical timing paths in accordance with an embodiment.

FIG. 6 is a flow chart illustrating a method according to one embodiment. At block 602 an initial layout is created. Such a layout can be formed as described above. For example, a netlist that describes all the components in a design, and describes how these components or pins on the components are interconnected may be formed by a computing device.

The netlist (or other description of the circuit) may be analyzed at block 604 to identify paths, their elements and slack. In one embodiment, the slack is the difference between a clock period (e.g., 200 nanoseconds) and the time for a signal to traverse the path. If the slack is negative, the path is identified as critical. The elements can be classified as fixed and movable. In some cases, an element may also be classified as pseudo-fixed in cases where it is in a path that is almost critical, for example.

At block 606 it is determined if the circuit is optimized. Such optimization is described more fully below. If it is, processing ends. Otherwise, processing proceeds to block 608 where non-fixed combos are moved towards the median/segmented line. This process is referred to herein as "straightening." The movement could be step wise in small increments toward the median/segmented line in one embodiment. Further, it shall be understood that movements may be limited in cases were one combo is part of two or more paths as is explained with relation to FIG. 4 above. In such a case, a combo may be moved only so far as such that it does not convert a path from a functioning status to a critical path. In such a case, in one embodiment, the location of the combo may be locked as part of moving it moving with the location of the lock being within a region that keeps one of the two or more paths from becoming a critical path. In yet another embodiment, the movement might be limited such that the total amount of negative slack in the system that includes the two or more paths is reduced. For example, assume that one path has −15 ns of slack and another has −50 ns. If moving one combo results in the first and second paths both having −30 ns (−60 ns total) then such a move may be permitted.

At block 610 a revised layout is formed based on the moved combos. It shall be understood that each time an individual combo is moved the processing of block 610 could be implemented. Of course, in other embodiments, many combos could be moved before a revised layout is formed. Processing then returns to block 604 in one embodiment. It shall be understood, however, that the identification performed in block 604 after the pass through the flow chart in FIG. 6 may be limited to paths that were affected by the straightening in block 608 in one embodiment.

Figure 7:
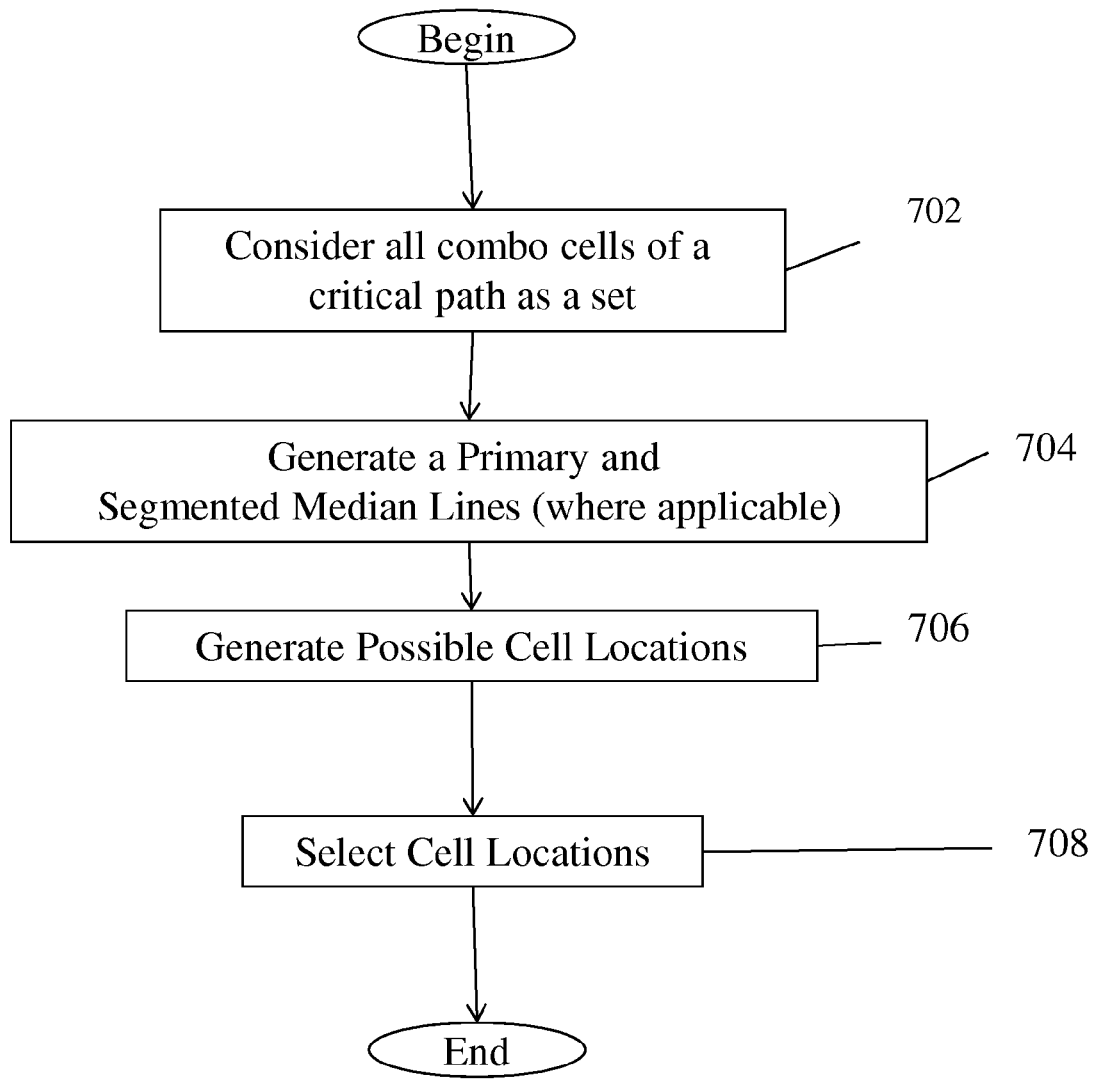
FIG. 7 depicts a process flow for straightening a critical timing path in accordance with an embodiment.

FIG. 7 is a flow chart illustrating steps that may be performed to straighten one or more paths according to one embodiment. The steps performed in this flow chart could be contained as part of block 608 but may also include steps are performed in a second iteration of block 604.

At block 702, all combos in a path are grouped as a set. At block 704, for each path, a primary median is generated. In each set that contains one or more fixed combos, a segmented median line is also generated. It shall be understood that in some cases, a primary median line may not be straight if it has to be formed such that it avoids a blockage or an otherwise reserved portion. Similarly, portions of a segmented median line will also take into account such blockages.

At block 706 possible cell locations are generated for the movable cells of a particular critical path. Such possible cell locations may include an indication of the slack reduction that may be achieved by the move and any negative effects on other paths that may result. In the case where only a median line is present, the move is towards or to the median line to the extent that this may be accomplished without too large a negative effect on another path. In cases where both median and segmented lines are present, a "preferred" cell location may move the cell closer to both lines. Of course, as one cell is moved, one or both of these lines may need to be updated before the next cell is processed.

At block 708 an updated cells locations are selected. Such a selection can include resolving conflicts between paths as described above.

The above description provides the skilled artisan a framework for reducing the effects or presence of critical paths. Of course, many other steps or considerations could be included. Further, many of the steps described above are shown as singular steps. It shall be understood that many of them be performed recursively or repeatedly until a particular result is achieved. It shall also be understood that while methods of improving critical paths have been disclosed, not all paths need be corrected in order to fall within the teachings herein.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for designing an integrated circuit, the method comprising:
    forming, on a computing device, a description of an initial layout of the integrated circuit, the layout including at least two paths, each of the two paths including an input, an output and at least one combinational element;
    identifying critical paths in the initial layout;
    forming a median line between start and end locations for at least one of the critical paths; and moving a location of a combinational element in the at least one critical path from a first location to a second location to form a revised layout, the second location being closer to the median line than the first location.

2. The computer implemented method of claim 1, wherein the initial description is a netlist.

3. The computer implemented method of claim 1, further comprising:

identifying critical paths in the revised layout.

4. The computer implemented method of claim 1, wherein forming the median line includes forming a median line that directly connects the start location to the end location.

5. The computer implemented method of claim 1, further comprising:

determining that the at least one critical path includes at least one fixed element that is not the input or the output; and forming a segmented line between the at least one fixed element and an adjacent element.

6. The computer implemented method of claim 5, wherein the combinational element is moved closer to both the original and the segmented median line.

7. The computer implemented method of claim 1, wherein forming the median line includes traversing a reserved area between start and end locations.

8. The computer implemented method of claim 1, wherein the combinational element is part of another path and wherein the combinational element is moved such that the other path does not become a critical path.

9. The computer implemented method of claim 1, wherein a measure of effort to move a combinational element closer to a median line is proportional to relative timing criticality of a given timing path.

10. The computer implemented method of claim 1, wherein the combinational element belongs to at least two critical paths and is moved closer to the median line of the path having higher timing criticality.

11. A computer program product for implementing designing an integrated circuit, the computer program product comprising:

a tangible storage medium readable by a processing circuit and storing instructions for execution by the processing circuit for performing a method comprising:

forming, on a computing device, a description of an initial layout of the integrated circuit, the layout including at least two paths, each of the two paths including an input, an output and at least one combinational element;

identifying critical paths in the initial layout;

forming a median line between start and end locations for at least one of the critical paths; and moving a location of a combinational element in the at least one critical path from a first location to a second location to form a revised layout, the second location being closer to the median line than the first location.

12. The computer program product of claim 11, wherein the initial description is a netlist.

13. The computer program product of claim 11, the method further comprising:

identifying critical paths in the revised layout.

14. The computer program product of claim 11, wherein forming the median line includes forming a median line that directly connects the start location to the end location.

15. The computer program product of claim 11, the method further comprising:

determining that the at least one critical path includes at least one fixed element that is not the input or the output; and forming a segmented line between the at least one fixed element and an adjacent element.

16. The computer program product of claim 15, wherein the combinational element is moved closer to both the original and the segmented median line.

17. The computer program product of claim 11, wherein forming the median line includes traversing a reserved area between the start and end locations.

18. The computer program product of claim 11, wherein the combinational element is part of another path and wherein the combination is moved such that the other path does not become a critical path.

* * * * *